United States Patent [19]

Hatch et al.

[11] Patent Number: 4,611,293

[45] Date of Patent: Sep. 9, 1986

[54] METHOD AND APPARATUS FOR AUTOMATIC CALIBRATION OF MAGNETIC COMPASS

[75] Inventors: Ronald R. Hatch, Wilmington; Richard G. Keegan, Torrance, both of Calif.

[73] Assignee: Magnavox Government and Industrial Electronics Company, Fort Wayne, Ind.

[21] Appl. No.: 555,885

[22] Filed: Nov. 28, 1983

[51] Int. Cl.$^4$ .................. G01C 17/38; G06F 15/31
[52] U.S. Cl. ........................... 364/571; 33/355 R; 33/356; 324/245; 364/559
[58] Field of Search .............. 364/556, 559, 571; 324/244, 245; 33/355 R, 356, 357

[56] References Cited

U.S. PATENT DOCUMENTS

| | | | |
|---|---|---|---|
| 2,692,970 | 10/1954 | Tolles | 33/356 X |
| 2,802,983 | 8/1957 | Tolles | 33/357 X |
| 2,834,939 | 5/1958 | Tolles | 324/244 |
| 3,952,420 | 4/1976 | Benjamin et al. | 33/361 |
| 3,991,361 | 11/1976 | Mattern et al. | 33/356 X |
| 4,091,543 | 5/1978 | Lapeyre | 364/571 X |
| 4,124,897 | 11/1978 | Martin | 364/571 |
| 4,163,326 | 8/1979 | Edwards | 33/361 |
| 4,179,741 | 12/1979 | Rossani | 33/356 X |
| 4,262,427 | 4/1981 | Lynch et al. | 33/361 |
| 4,327,498 | 5/1982 | Setter et al. | 33/356 X |
| 4,336,596 | 6/1982 | Martin | 364/571 X |
| 4,380,735 | 4/1983 | Bell | 324/244 |
| 4,399,615 | 8/1983 | Matsumoto et al. | 324/244 X |
| 4,414,753 | 11/1983 | Moulin et al. | 33/356 |
| 4,416,067 | 11/1983 | Scherer et al. | 364/571 X |
| 4,445,279 | 5/1984 | Tsushima et al. | 364/571 X |

Primary Examiner—Felix D. Gruber
Attorney, Agent, or Firm—Thomas A. Briody; William J. Streeter; Richard T. Seeger

[57] ABSTRACT

A three winding induction compass mounted in a host vehicle has each winding output coupled to an analog to digital converter. Each winding output is weighted and accumulated by a push down stack circuit to obtain a time filtered output and the maximum and minimum values of each filtered output are determined and stored as the vehicle is turned in a 360° circle. The distortions due to the permanent and induced magnetism of the host vehicle and due to winding imbalance between the three windings and misorientation of the three windings are obtained from the maximum and minimum values to obtain calibration parameters. The calibration parameters for the windings are applied to the outputs of the three windings to obtain an equivalent two winding output which is normalized for determining the corrected compass heading.

24 Claims, 4 Drawing Figures

METHOD AND APPARATUS FOR AUTOMATIC CALIBRATION OF MAGNETIC COMPASS

BACKGROUND OF THE INVENTION

1. Field of the Invention

This invention is in the field of automatic calibration of magnetic compasses, such as induction and Hall effect compasses, and more particularly to the calibration of compasses mounted in a host vehicle that has permanent and induced magnetic fields.

2. Description of the Prior Art

Various sources distort the earth's magnetic field as seen by a magnetic compass mounted in a host vehicle. The purpose of calibrating a magnetic compass is to determine the amount of distortion and to provide a corresponding correction. The two basic sources of distortion are the permanent and induced magnetism of the host vehicle. In addition, the non-ideal nature of the magnetic sensor itself contributes effects which require correction. Numerous efforts have been made to provide these corrections. These include various methods of establishing or estimating a correction signal and applying a feedback signal to bucking coils coupled to the compass windings, the use of a gyrocompass in conjunction with the compass windings, and applying estimated compensation values to the signals from the compass windings. These efforts have been largely unsatisfactory since, while perhaps recognizing the complexity of the problem, they are only partial and inadequate solutions or are misdirected and no solution.

SUMMARY OF THE INVENTION

Magnetic field distortions to be removed include those due to permanent and induced magnetism of the host vehicle. The distortions are to the earth's magnetic field vector, i.e. a signal having both amplitude and direction, to be measured by the compass. Without the distortions, the vectors measured by the compass as the host vehicle is turned in a complete circle define a perfect circle centered at the origin of a given coordinate system.

Permanent magnetism and the vertical component of induced magnetism of the host vehicle cause an increase or decrease in the magnetic flux density seen by the compass depending on the orientation of the vehicle in the earth's magnetic field. The net result is a translation of the perfect circle away from the origin to a new center having coordinates $B_x$, $B_y$. The horizontal component of the induced magnetism may result in a more complicated distortion pattern. Depending on the non-symmetrical nature of the induced field from the soft iron in the host vehicle and the vehicle orientation, the compass may see either an increased or a decreased magnetic flux density as a function of the particular orientation. However, the magnitude of the induced magnetism is independent of the polarity of the magnetizing field. If an increased flux density is observed at a particular host vehicle orientation due to the horizontal component of induced magnetism then an equal increase will be observed at an opposite vehicle orientation as well. The net result of the horizontal component of induced magnetism is to cause the perfect circle described above to become an ellipse. This ellipse is aligned with the semimajor axis in the direction at which the host vehicle induces a maximum in the magnetic flux density as seen by the compass. This elliptic effect can be defined by three terms:

(1) a—scaling along the semimajor axis.
(2) b—scaling along the semiminor axis.
(3) $\theta$—the angle between North and the semimajor axis.

The total distortion from permanent and induced magnetism can then be described by five parameters, $B_x$, $B_y$, a, b, and $\theta$. This invention provides for determining these parameters.

A flux gate sensor is a type of two axis magnetometer which measures the complex amplitude of the earth's magnetic field in the plane of the sensor. In this description, "two axis" or "two winding" compass mean a magnetometer having a winding along each of two mutually orthogonal axes in a two dimensional plane. A "three winding" or "three axis" compass is a magnetometer having a winding along each of three equally spaced axes in a two dimensional plane. Since the sensor measures the complex amplitude of the field, mathematical compensation can be applied to the measurements to remove the anomalies of permanent and induced magnetism. Flux gate sensors are typically constructed in either two or three winding configurations. The two winding sensor measures the complex amplitude in quadrature whereas the three winding sensor measures the complex amplitude on a three vector basis, the windings being arcuately separated from one another by 120°. The calibration disclosed herein is implemented with the three winding sensor.

Other distortion effects that are corrected by this invention are those due to any gain imbalance and angular separation error between the three windings of the sensor. Manufacturing imperfections result in sensors which are not ideal. Two types of imperfections cause errors in the heading that are produced from these sensors. The two types are gain errors and angular separation errors. Each winding should have the same amplitude response from an external field and should be separated by 120°. The inherent imbalance of the three winding compass can be removed by making use of the fact that the three winding outputs, U, V, W, respectively, sum to zero. By combining the readings from the three windings in a particular way a new set of readings which is equivalent but much less sensitive to these error sources is created.

In the calibration of the magnetic compass the operator manually switches to a calibration mode and turns the host vehicle at least 360°. By taking a sequential sampling of U, V, W, from the three windings u, v, w, respectively, of the compass, a new set of readings is calculated. The U, V, W readings are time filtered and become U''', V''', W''' readings respectively. The time filtering is accomplished by using the previous seven readings of each of the winding outputs using the set:

$$F = P_1 - P_2 - 2P_3 + 4P_4 - 2P_5 - P_6 + P_7$$

where F=the filtered reading at time (t) and $P_1$-$P_7$ represent the winding outputs of U, V, W, sequentially at times (t) to (t−6) respectively, as will be more fully described. For example, to obtain a new reading U''', the above set becomes:

$$U'''(t) = U(t) - V(t-1) - 2W(t-2) + 4U(t-3) - 2V(t-4) - W(t-5) + U(t-6)$$

where time t=now.

The new set of readings are obtained using a "push down stack" of the previous set of seven samples. The new output would be a U‴ sample if the most recent stack entry was a U sample, it would be a V‴ sample if the most recent stack entry was a V sample, and it would be a W‴ sample if the most recent stack entry was a W sample. During the 360° turn of the host vehicle the maximum and minimum values of each of the three output readings U‴, V‴, W‴ are stored.

As stated previously, the effect of permanent magnetism and the vertical component of induced magnetism is to create an origin offset in the perfect circle or ellipse. This origin offset can be determined by finding the bias associated with each of the windings. The biases are the average of the minimum and maximum value for each of the winding readings U‴, V‴, W‴. These biases are then subtracted from all subsequent readings made on the particular winding including those used for induced magnetism calibration.

The horizontal component of induced magnetism has the effect of distorting the "perfect" circle into an ellipse, with its semimajor axis aligned with the direction at which the host vehicle induces a maximum in the magnetic flux density. The calibration procedure defines this elliptic shape by calculating the above mentioned three terms, (1) a—scaling along the semimajor axis, (2) b—scaling along the semiminor axis, (3) $\theta$—the angle between North and the semimajor axis, or equivalently a, b, SIN ($2\theta$) and COS ($2\theta$).

By making use of the mathematical equations which define an ellipse and the linear mappings which distort a perfect circle into an ellipse, inverse mappings are developed making use of the maximum values of the samples acquired during the 360° turn of the host vehicle. These inverse mappings are used to reverse the distortion caused by induced magnetism and to reconstruct the actual perfect circle.

It is therefore an object of this invention to provide a method and apparatus for calibrating a magnetic field compass mounted in a host vehicle to correct for distortions to the earth's magnetic field.

An object of this invention is to provide calibrations in the previous object for distortions due to permanent and induced magnetism of the host vehicle.

It is a further object of this invention to provide calibrations in the previous objects for compass winding imbalance and winding separation irregularity.

A further object is to time filter the readings of each of the windings of the compass.

Another object is to achieve the previous objects by taking the maximum and minimum readings of each winding during a 360° turn of the host vehicle to obtain calibration parameters.

The above mentioned and other features and objects of this invention and the manner of obtaining them will become more apparent and the invention itself will be best understood by reference to the following description of an embodiment of the invention taken in conjunction with the accompanying drawings.

DESCRIPTION OF A PREFERRED EMBODIMENT

Calibration parameters are determined from the maximum and minimum raw readings obtained from each winding of a three winding magnetic compass as the vehicle is turned through a complete circle. In the derivation for determining the parameters, first equations for a basic two winding two axis compass are considered. Next the two axis equations are related to a three winding three axis compass and the calibration parameters are computed. The winding imbalance and winding separation irregularity scale factors are determined. These parameters and scale factors are then used in the desired linear mapping of the raw readings from the three winding compass into the cosine and sine of the vehicle heading.

Figure 1:
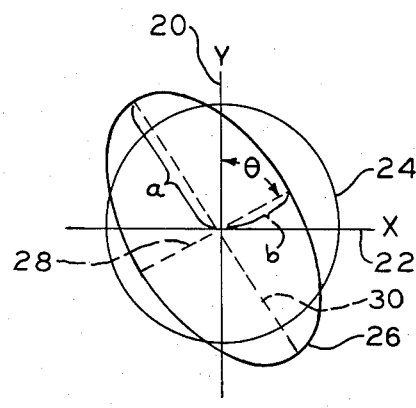
FIG. 1 is a plot diagram of a distorted field compass readings superposed on an undistorted field compass reading.

Referring to FIG. 1, a two axis compass mounted in a host vehicle, not shown, has y axis 20 aligned to the North and the x axis 22 aligned to the East, and if the earth's magnetic field is "perfect" then the compass readings will define circle 24 as the host vehicle is turned 360°. It is understood that initially the y axis may have any alignment providing the vehicle is turned in a 360° circle, the alignment shown being for purposes of explanation. The perfect readings are distorted by the effect of measurement distortions due to the induced and permanent magnetism effects of the host vehicle so that the readings will define an ellipse 26.

Assuming the compass readings are scaled to read +/−1 and all angles are positive clockwise, then:

$$x = \sin H$$
$$y = \cos H \quad (1)$$
$$r^2 = x^2 + y^2 = 1$$

where H=heading angle measured clockwise from the y axis.

These perfect field readings are distorted to reflect the effect of field distortions due to the induced and permanent magnetism of the host vehicle. These distortions are mathematically applied to the perfect readings in an order opposite to their removal from the measured readings.

First the readings are scaled as follows:

$$x' = ax$$
$$y' = ay \quad (2)$$
$$r'^2 = (x')^2 + (y')^{2''} = a^2$$

Next flattening of the circle defined by the last equation above is allowed to occur along any axis in space. Mathematically this effect can be accomplished by rotating the coordinate axes so that the y axis is rotated clockwise an angle $\theta$ and aligned along axis 28, the axis to be flattened. The flattening, or scaling, of the y measurement is then applied. The coordinate axes are then rotated back to their original position with y axis aligned to the North and the x axis aligned to the East.

x", y" are obtained in the following equations where C=Cos θ and S=Sin θ:

$$\begin{pmatrix} x'' \\ y'' \end{pmatrix} = \begin{pmatrix} C & -S \\ S & C \end{pmatrix} \begin{pmatrix} x' \\ y' \end{pmatrix} \quad (3)$$

Express x" and y" in terms of the perfect field readings using the equations:

$$x'' = aCx - aSy$$
$$y'' = aSx + aCy \quad (4)$$
$$r'' = (x'')^2 + (y'')^2 = a^2$$

The y axis reading is scaled by (1−f) where f varies from zero (circle) to 1 (straight line). The parameter "f" is called the flattening factor and is related to "e" the eccentricity factor, "a" the semimajor axis of ellipse 26, and "b" the semiminor axis of ellipse 26 by the following equations:

$$b = (1-f)a$$
$$b^2 = (1-e^2)a^2$$
$$e^2 = f(2-f) \quad (5)$$
$$f = 1 - \sqrt{1-e^2}$$

$$x''' = x'' \quad (6)$$
$$y''' = (1-f)y''$$

Or in terms of x and y:

$$x''' = aCx - aSy$$
$$y''' = aS(1-f)x + aC(1-f)y \quad (7)$$
$$(r''')^2 = a^2[1 - e^2(Sx+Cy)^2]$$

Next the coordinate axes are rotated back to their original positions using the following equations:

$$\begin{pmatrix} X \\ Y \end{pmatrix} = \begin{pmatrix} C & S \\ -S & C \end{pmatrix} \begin{pmatrix} x''' \\ y''' \end{pmatrix} \quad (8)$$

expressing in terms of x and y to obtain X, Y, and R gives:

$$X = a(1-fS^2)x - afCSy$$
$$Y = -afCSx + a(1-fC^2)y \quad (9)$$
$$R^2 = a^2[1 - e^2(SX+CY)^2]$$

The next step is to add on bias values $B_x$, $B_y$, the center coordinates of the transformed or displaced ellipse, such that the ellipse is moved off of the coordinate center to obtain X', Y':

$$X' = a[(1-fS^2)x - fCSy] + B_x \quad (10)$$
$$Y' = a[-fCS\,x + (1-fC^2)y] + B_y$$

Equation (10) shows that the X', Y' measurements of a practical two axis compass are a complex function of the desired values of x, y from a perfect field two axis compass.

However, as shown below, if the parameters $B_x$, $B_y$, a, f, C, S can be determined then the reverse mapping can be constructed by reversing the distortion steps above:

$$X = (X' - B_x) = a[(1-fS^2)x - fCSy] \quad (11)$$
$$Y = (Y' - B_y) = a[-fCSx + (1-fC^2)y]$$

Rotate coordinates as follows:

$$\begin{pmatrix} X'' \\ Y'' \end{pmatrix} = \begin{pmatrix} C & -S \\ S & C \end{pmatrix} \begin{pmatrix} X \\ Y \end{pmatrix} \quad (12)$$

or:

$$X'' = CX - SY = a(Cx - Sy) \quad (13)$$
$$Y'' = SX + CY = a(1-f)(Sx + Cy)$$

Now the Y" reading is amplified by dividing by the factor (1−f) to give:

$$X''' = X'' = aCx - aSy \quad (14)$$
$$Y''' = Y''/(1-f) = aSx + aCy$$

or:

$$X''' = CX - SY = aCx - aSy \quad (15)$$
$$Y''' = (SX + CY)/(1-f) = aSx + aCy$$

Rotate back to original coordinates as follows:

$$\begin{pmatrix} X^{iv} \\ Y^{iv} \end{pmatrix} = \begin{pmatrix} C & S \\ -S & C \end{pmatrix} \begin{pmatrix} X''' \\ Y''' \end{pmatrix} \quad (16)$$

which gives:

$$X^{iv} = \frac{1}{(1-f)}[(1-fC^2)X + fCSY] = ax \quad (17)$$

$$Y^{iv} = \frac{1}{(1-f)}[fCSX + (1-fS^2)Y] = ay$$

Next, dividing by "a" and using equation (5) gives:

$$x = \frac{1}{b}[(1-fC^2)X + fCSY] \quad (18)$$

$$y = \frac{1}{b}[fCSX + (1-fS^2)Y]$$

which in terms of biased measurements is:

$$x = \frac{1}{b}[(1-fC^2)(X' - B_x) + fCS(Y' - B_y)] \quad (19)$$

$$y = \frac{1}{b}[fCS(X' - B_x) + (1-fS^2)(Y' - B_y)]$$

Equations (19) show how to correct the measurements actually obtained from a two axis compass if the parameters describing the size, orientation, and coordinate center offset are available.

In a three axis (three winding) flux gate compass, if the three axes are labeled as u, v, and w, respectively, and the u axis is aligned to North as was the y axis of the two axis compass then the following relationship between the two axis and three axis compasses is obtained:

$$\begin{pmatrix} U \\ V \\ W \end{pmatrix} = \begin{pmatrix} 1 & 0 \\ -\frac{1}{2} & \frac{\sqrt{3}}{2} \\ -\frac{1}{2} & -\frac{\sqrt{3}}{2} \end{pmatrix} \begin{pmatrix} y \\ x \end{pmatrix} \quad (20)$$

Thus if readings U, V, W are obtained from the windings on the three axes u, v, w, respectively, the equivalent values of readings x, y of a two axis compass can be determined from equations (20) when considered as three equations in two unknowns.

Forming the least squares solution to equation (20) gives:

$$\begin{pmatrix} x \\ y \end{pmatrix} = \begin{pmatrix} 0 & \frac{1}{\sqrt{3}} & -\frac{1}{\sqrt{3}} \\ \frac{2}{3} & -\frac{1}{3} & -\frac{1}{3} \end{pmatrix} \begin{pmatrix} U \\ V \\ W \end{pmatrix} \quad (21)$$

Equation (21) simply relates the two axis and three axis coordinates and therefore can be used to map either raw readings or corrected readings from the three axis to the equivalent two axis values.

Calibration parameters $B_x$, $B_y$, a, f, and $\theta$ or their equivalent are needed in order to correct the raw compass readings.

The six readings corresponding to the maximum and minimum readings on each of the three axes of the three winding compass are sufficient to compute the equivalent parameter set $B_u$, $B_v$, $B_w$, a, f, C and S, where $C = \cos \theta$ and $S = \sin \theta$. Though there are seven parameters in this set only five are independent and six measurements are available. The six measurements are designated by:

$\overline{U}, \underline{U}, \overline{V}, \underline{V}, \overline{W},$ and $\underline{W}$ where the bar designates the maximum if above and minimum if below. U, V, W are raw readings from the windings on the u, v, w axes respectively.

The first three calibration parameters $B_u$, $B_v$, $B_w$, are obtained by:

$$B_u = (\overline{U} + \underline{U})/2 \quad (22)$$
$$B_v = (\overline{V} + \underline{V})/2$$
$$B_w = (\overline{W} + \underline{W})/2$$

The maximum readings are now corrected by removing the biases $B_u$, $B_v$, $B_w$, for use in later equations:

$$U' = \overline{U} - B_u = (\overline{U} - \underline{U})/2 \quad (23)$$
$$V' = \overline{V} - B_v = (\overline{V} - \underline{V})/2$$
$$W' = \overline{W} - B_w = (\overline{W} - \underline{W})/2$$

Since the u axis of the three axis compass is aligned in the same direction as the y axis of the two axis compass then from equation (9) the measurement U after correction for bias is:

$$U = a[-fCSx + (1-fC^2)y] \quad (24)$$

The maximum value of the U measurement can be found by taking the derivative with respect to the heading H which from equations (1) and (24) is:

$$dU/dH = 0 = a[-fCSy - (1-fC^2)x] \quad (25)$$

Simplifying and squaring equation (25) gives:

$$(fCS)^2 y^2 = (1-fC^2)^2 x^2 \quad (26)$$

using equation (1) to eliminate $x^2$ gives $$[(1-fC^2)^2 + (fCS)^2]y^2 = (1-fC^2)^2 \quad (27)$$

or solving for $y^2$ when $U = U\pi$ (U is maximum)

$$y^2 = \frac{(1-fC^2)^2}{(1-fC^2)^2 + (fCS)^2} \quad (28)$$

Equation (25) can be used in equation (24) to eliminate x:

$$U' = a \left[ \frac{(fCS)^2 + (1-fC^2)^2}{(1-fC^2)} \right] y \quad (29)$$

Squaring equation (29):

$$(U')^2 = a^2 \left[ \frac{[(fCS)^2 + (1-fC^2)^2]^2}{(1-fC^2)^2} \right] y^2 \quad (30)$$

Substituting the equation (28) value of $y^2$ in equation (30) gives:

$$(U')^2 = a^2[(fCS)^2 + (1-fC^2)^2] \quad (31)$$

Simplifying, substituting $e^2 = f(2-f)$, equation (5), and combining terms in equation (31) gives:

$$(U')^2 = a^2(1 - e^2 C^2) \quad (32)$$

Only one parameter in equation (32) depended on the choice of the coordinate reading U rather than V or W. That parameter is C, or $\cos \theta$, since $\theta$ was measured clockwise from the u axis. This means that the equations for $(V')^2$ and $(W')^2$ can be written as:

$$(V')^2 = a^2(1 - e^2 \cos^2 \theta') \quad (33)$$

$$(W')^2 = a^2(1 - e^2 \cos^2 \theta'')$$

where
$\theta' = \theta - 120°$
$\theta'' = \theta + 120°$

Equations (32) and (33) can be written in terms of $\theta$ by expanding the cosine and the sum of two angles:

$$(U')^2 = a^2[1 - e^2(\cos^2 \theta)] \quad (34)$$

$$(V')^2 = a^2\left[1 - e^2\left(\frac{1}{4}\cos^2\theta - \frac{\sqrt{3}}{2}\sin\theta\cos\theta + \frac{3}{4}\sin^2\theta\right)\right]$$

$$(W')^2 = a^2\left[1 - e^2\left(\frac{1}{4}\cos^2\theta + \frac{\sqrt{3}}{2}\sin\theta\cos\theta + \frac{3}{4}\sin^2\theta\right)\right]$$

Taking the average of the equations above and defining the value as Z obtains the following:

$$Z = [(U')^2 + (V')^2 + (W')^2]/3 = a^2(1 - e^2/2) \qquad (35)$$

The value P is formed as follows:

$$P = Z - (U')^2 = \frac{a^2 e^2}{2}(2\cos^2\theta - 1) \qquad (36)$$

or:

$$P = \frac{a^2 e^2}{2} \cos 2\theta \qquad (37)$$

The value Q is formed as follows:

$$Q = [(V')^2 - (W')^2]/\sqrt{3} = \frac{a^2 e^2}{2} \sin 2\theta \qquad (38)$$

The value R is formed as follows:

$$R = \sqrt{P^2 + Q^2} = \frac{a^2 e^2}{2} \qquad (39)$$

Then:

$$Q/R = \sin 2\theta = S_2 \qquad (40)$$

$$P/R = \cos 2\theta = C_2 \qquad (41)$$

$$\sqrt{Z + R} = a \qquad (42)$$

$$\sqrt{Z - R} = b \qquad (43)$$

$$(1 - f) = \frac{b}{a} \qquad (44)$$

$$g = 1 + \frac{b}{a} \qquad (44a)$$

$$f = 1 - (1 - f) \qquad (45)$$

$$(2 - f) = 1 + (1 - f) \qquad (46)$$

From equations (40), (41), (43), (44a), (45) and (46) $K_1$, $K_2$, and $K_3$ are obtained as follows:

$$K_1 = \frac{(2 - f) - fC_2}{2b} = \frac{g - fC_2}{2b} \qquad (47)$$

$$K_2 = fS_2/2b \qquad (48)$$

$$K_3 = \frac{(2 - f) + fC_2}{2b} = \frac{g + fC_2}{2b} \qquad (49)$$

The procedure to remove induced and permanent magnetism effects of the host vehicle will now be discussed. The fewest operations for mapping the raw U, V, W compass readings to the desired x, y, and cosine and sine of the heading values is first to use the derived bias parameters obtained from equation (22) as follows:

$$U' = U - B_u$$
$$V' = V - B_v \qquad (50)$$
$$W' = W - B_w$$

These bias free values can then be mapped using equation (21) to bias free x, y equivalent readings which can then in turn be mapped using equation (19) to the desired biased x, y readings.

If equation (19) is converted using half angle formulas and $K_1$, $K_2$, and $K_3$ from equations (47), (48) and (49) substituted, the following equation results:

$$\begin{pmatrix} x \\ y \end{pmatrix} = \begin{pmatrix} K_1 & K_2 \\ K_2 & K_3 \end{pmatrix} \begin{pmatrix} 0 & \frac{\sqrt{3}}{3} & -\frac{\sqrt{3}}{3} \\ \frac{2}{3} & -\frac{1}{3} & -\frac{1}{3} \end{pmatrix} \begin{pmatrix} U - B_u \\ V - B_v \\ W - B_w \end{pmatrix} \qquad (51)$$

Simplifying:

$$\begin{pmatrix} x \\ y \end{pmatrix} = \frac{1}{3}\begin{pmatrix} 2K_2 & (-K_2 + \sqrt{3}K_1) & (-K_2 - \sqrt{3}K_1) \\ 2K_3 & (-K_3 + \sqrt{3}K_2) & (-K_3 - \sqrt{3}K_2) \end{pmatrix}\begin{pmatrix} U - B_u \\ V - B_v \\ W - B_w \end{pmatrix} \qquad (52)$$

The elements of this matrix can be precomputed and used until the compass is recalibrated.

$K_1$, $K_2$, and $K_3$ have by equations (47), (48) and (49), respectively, a common divisor of 2b. If this divisor is not used no adverse effects are encountered since the radius of the mapped circle is simply larger and the scale is removed in the arc tangent computation of the heading. The normalizing, later described, makes unnecessary the divisor 2b and the ⅓ factor of equation (52).

This calibration procedure also removes any winding misorientation effects. This is due to the fact that any winding misorientation effects can be completely accounted for as winding imbalance effects. If the u winding is defined as having the correct scale and orientation, the scales of the v and w windings are defined as Kv and Kw, respectively, and the misorientations of the v and w windings are defined as $\theta v$ and $\theta w$, respectively.

Further, define:

$$\bar{K} = (Kv + Kw)/2 \qquad (53)$$
$$\Delta K = (Kv - Kw)/2$$
$$\bar{\theta} = (\theta v + \theta w)/2$$
$$\Delta\theta = (\theta v - \theta w)/2$$

With these definitions it can be shown that the misorientation effects can be mapped into winding imbalance effects by:

$$\bar{K} = \frac{\cos \bar{\theta}}{2\sin(30° + \Delta\theta)} \qquad (54)$$

$$\Delta K = \frac{\sin \bar{\theta}}{2\cos(30° + \Delta\theta)}$$

Mapping "perfect" U''', V''', W''' readings can be obtained by a mapping of the imperfect readings. The desired mapping is:

$$\begin{pmatrix} U'' \\ V'' \\ W'' \end{pmatrix} = \begin{pmatrix} 2 & -1 & -1 \\ -1 & 2 & -1 \\ -1 & -1 & 2 \end{pmatrix}\begin{pmatrix} U \\ V \\ W \end{pmatrix} \qquad (55)$$

where U, V, W are raw readings and U'', V'', W'' designate the "perfect" readings.

The U", V", and W" readings will always sum to zero, the mapping is simple, i.e. does not involve irrational numbers, and is symmetrical in U", V", and W".

A disadvantage is that the raw readings should be made simultaneously to avoid introducing errors caused by the rate of change of heading. The use of three A to D converters in parallel could be used to remove this disadvantage. Another way of at least reducing the effects of rate of change of heading is to combine raw headings such that their average age is identical before implementing the mapping of equation (55). This is the approach of this invention which also has the effect of averaging the readings which is an advantage if the readings are obtained rapidly but a disadvantage if they are obtained at only a slow rate. This mapping is:

$$\begin{pmatrix} U'' \\ V'' \\ W'' \end{pmatrix} = \begin{pmatrix} 1 & -1 & -2 & 4 & -2 & -1 & 1 & 0 & 0 \\ 0 & 1 & -1 & -2 & 4 & -2 & -1 & 1 & 0 \\ 0 & 0 & 1 & -1 & -2 & 4 & -2 & -1 & 1 \end{pmatrix} \begin{pmatrix} U_1 \\ V_1 \\ W_1 \\ U_2 \\ V_2 \\ W_2 \\ U_3 \\ V_3 \\ W_3 \end{pmatrix} \quad (56)$$

Where: $U_1$, $V_1$, $W_1$ represent readings at time t=now; $U_2$, $V_2$, $W_2$ represent readings at time t−1; $U_3$, $V_3$, $W_3$ represent readings at time t−2.

This equation because it is symmetrical in U", V", and W" can be implemented to act on a push down stack of the last seven raw readings. By taking a sequential sampling of U, V, W the new set of readings can be calculated in the following manner: "new" or filtered readings of U, V, W are calculated to obtain U", V", W" readings, respectively, using the previous seven readings of each of the winding outputs comprising the set:

$$F = P_1 - P_2 - 2P_3 + 4P_4 - 2P_5 - P_6 + P_7$$

where F=the filtered reading at time (t) and $P_1$-$P_7$ represent the winding outputs U, V, W sequentially at times (t) to (t−6) respectively.

Thus, using this set to obtain U", V", W", the following is obtained:

$$U''(t) = U(t) - V(t-1) - 2W(t-2) + 4U(t-3) - 2V(t-4) - W(t-5) + U(t-6)$$

where time t=now.

$$V''(t) = V(t) - W(t-1) - 2U(t-2) + 4V(t-3) - 2W(t-4) - U(t-5) + V(t-6)$$

where time t=now.

$$W''(t) = W(t) - U(t-1) - 2V(t-2) + 4W(t-3) - 2U(t-4) - V(t-5) + W(t-6)$$

where time t=now.

The new set of readings are obtained using the push down stack of the previous set of seven samples and is performed by block 64, later described.

Figure 3:
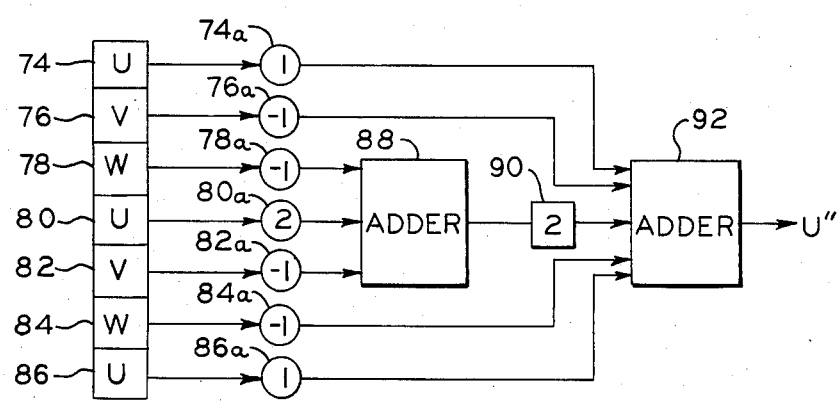
FIG. 3 is a push down stack schematic block diagram for obtaining the time filtered readings of the compass winding outputs.
Figure 2:
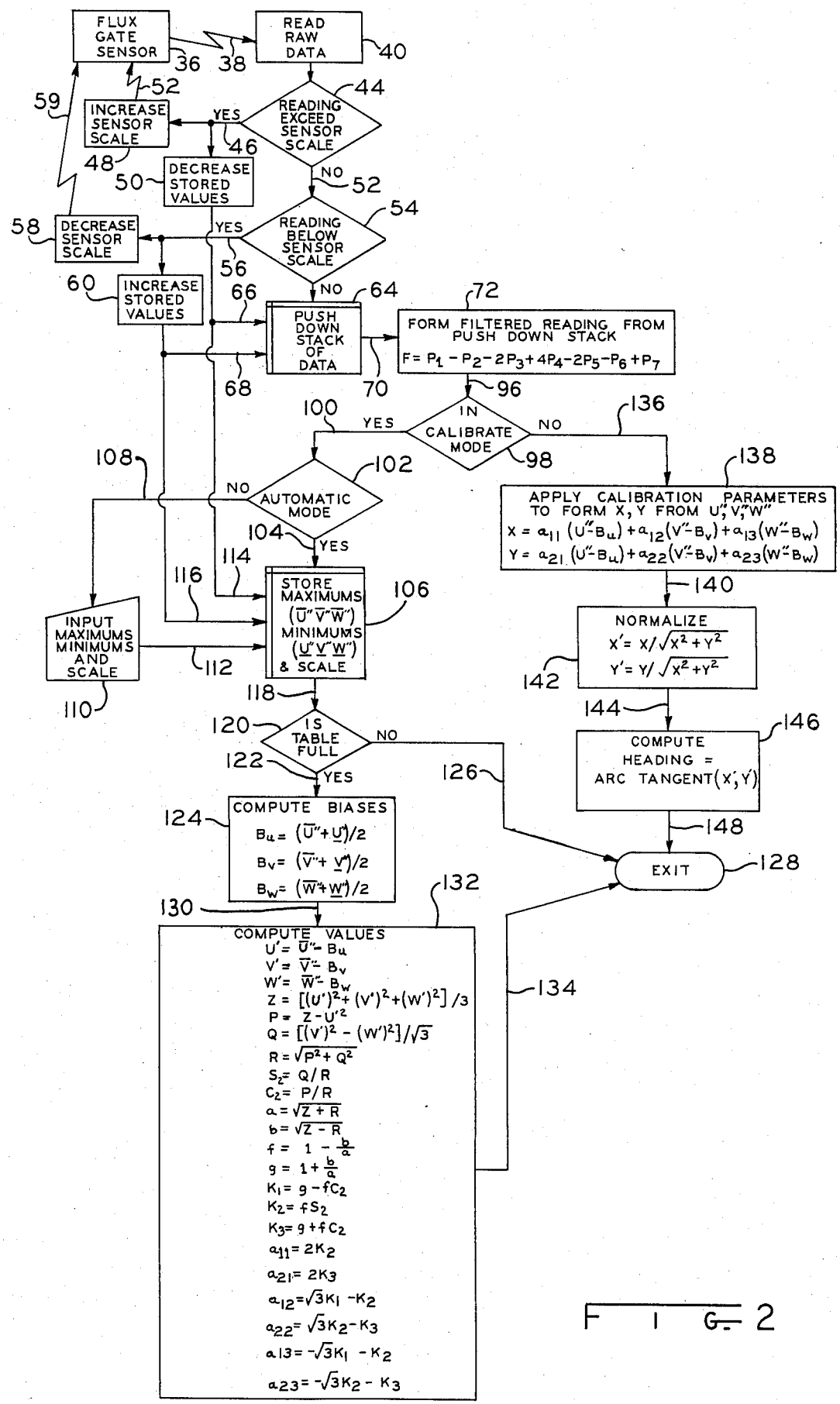
FIG. 2 is a flow chart diagram of an embodiment of this invention.
Figure 4:
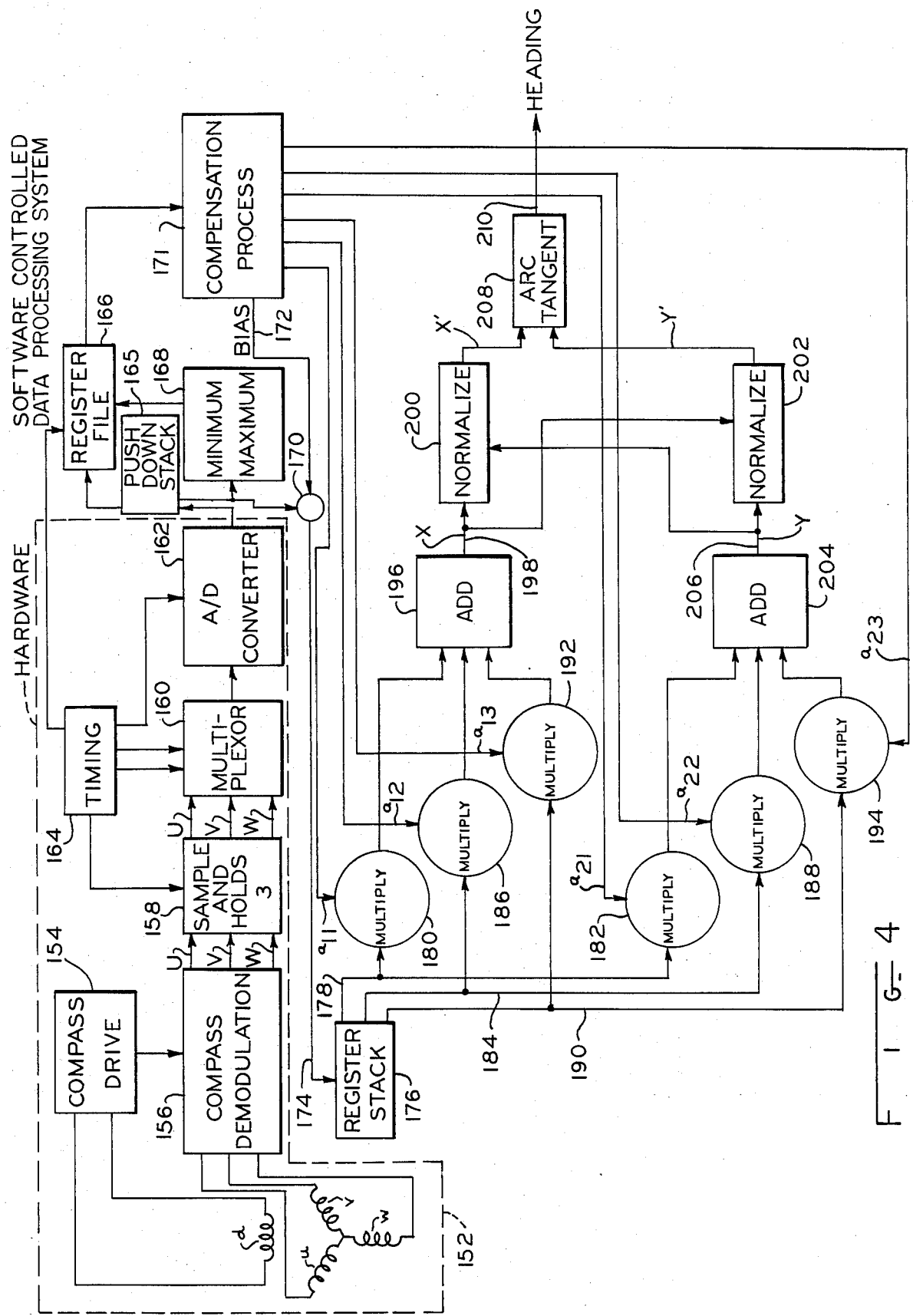
FIG. 4 is a block diagram of the embodiment of FIG. 2.

Referring now to FIGS. 2–4 and in particular to FIG. 2 a flow chart diagram of an embodiment of this invention is shown. In the diagram of FIG. 2 the logic "decision make" functions are represented in diamonds, "compute" functions are represented in blocks and hardware is represented in blocks defined below as circuits. Flux Gate Sensor block 36 is a three winding flux gate compass, or other magnetometer, and contains interface circuitry to the compass windings, the interface circuitry being any appropriate circuitry known to the art for the purpose of quantizing the compass signals for processing. The winding analog outputs are converted to digital signals in block 36 and are fed on path 38 to Read Raw Data block 40 where the readings are outputted on path 42 to Reading Exceed Sensor Scale decision make 44 where the amplitude of the block 40 outputs are compared to the present upper amplitude of the block 36 sensor scale. If the readings from block 40 exceed the sensor scale, this decision is fed on "yes" path 46 to Increase Sensor Scale block 48 and Decrease Stored Values block 50. Block 48 feeds increase scale information via path 52 to block 36 to increase the sensor scale to include the present upper amplitude. If the present readings do not exceed the sensor scale, this decision is indicated on "no" path 52 to Reading Below Sensor Scale decision make 54. If the reading is below the present scale lower limit, this decision is fed on the "yes" path 56 to Decrease Sensor Scale block 58 and Increase Stored Values block 60, block 58 feeding decrease sensor scale information to block 36 via path 59. If the amplitude reading is now below the present scale lower limit, this decision is fed on the "no" path 62 to push down stack block 64, later described. Block 64 is indicated by the double line on the top and left side indicating it is a table stored in memory. Also, blocks 50, 60 feed decrease and increase information, respectively, via paths 66, 68, respectively, to block 64 in order to maintain the incoming and stored data on the same amplitude scale.

One method of increasing or decreasing the sensor scales is integrating means for integrating the winding incremental outputs and increasing the number of winding incremental outputs integrated when the winding outputs fall below the sensor scale and decreasing the number of winding incremental outputs integrated when the winding outputs are above the sensor scale, as is known in the art.

The output of block 64 on path 70 is shown in block 72 and has the form:

$$F = P_1 - P_2 - 2P_3 + 4P_4 - 2P_5 - P_6 + P_7.$$

Referring to FIG. 3 block 64 will be described. Inputs of raw readings U, V, W are sequentially made to terminals 74–86 with an U reading being shown at terminal 74 in the time period shown in FIG. 3 to obtain U". The readings at terminals 74–86 are multiplied by multipliers 74a–86a, respectively, having multiplying factors 1, −1, −1, 2, −1, −1, and 1 respectively. The outputs of multipliers 78a, 80a, 82a are summed in adder 88 and multiplied by a factor of 2 in multiplier 90. The outputs of multipliers 74a, 76a, 90, 84a, 86a are summed in adder 92 to obtain "aged" reading U". It is understood that to obtain aged reading V", a V reading is applied to terminal 74 and the readings in each of the lower terminals 76–86 are "pushed down" one letter in the series U, V, W. To obtain aged reading W", a W reading is applied to terminal 74 and the readings in each of the lower terminals 76–86 are "pushed down" one letter in the series U, V, W. Thus, the aged output would be a U" sample if the most recent stack entry was a U sample, it would be a V" sample if the most recent entry was a V, and it would be a W" sample if the most recent entry was a W.

The generation of this aged set of samples $U''$, $V''$, $W''$ is done prior to any calibration including the acquisition of the maximum and minimum values of the outputs of each of the three windings.

The aged or time filtered outputs $U''$, $V''$, $W''$ from block 72 are directed via path 96 to In Calibrate Mode decision make 98. If the operator has switched the system to the calibrate mode, then the outputs on path 96 are fed via "yes" path 100 to Automatic Mode decision make 102. If the operator has switched the system to automatic mode, the outputs on path 100 are fed via "yes" path 104 to Store Maximums Minimums & Scale circuit 106 where they are stored and scaled. Scaling in circuit 106 is performed from input via paths 114, 116 from blocks 50, 60, respectively.

The scaled maximum and minimum values from circuit 106 are fed via path 118 to Is Table Full decision make 120 whereat it is decided whether the table of values in circuit 106 is full. If the decision is yes, then an enable signal is fed via "yes" path 122 to Compute Biases block 124 where biases $B_u$, $B_v$, $B_w$ are computed according to equations (22). If the decision is no, then a disable signal is fed via "no" path 126 to exit 128.

The bias outputs $B_u$, $B_v$, $B_w$ from block 124 are used in block 138 as described below and are fed via path 130 to Compute Values block 132 where the values of equations (23), (35), (38)–(44a), and (47)–(49) are computed. It is noted that the equations in block 132 for computing $K_1$, $K_2$, and $K_3$ do not correspond exactly to equations (47)–(49) since they do not have the divisor 2b. As mentioned, if this divisor is not used no adverse effects are encountered since the radius of the mapped circle is simply larger and the scale is removed in the arc tangent computation of the heading. The normalizing, later described, makes unnecessary the divisor 2b and the $\frac{1}{3}$ factor of equation (52). Additionally, the following values are computed in block 132:

$$a_{11} = 2K_2$$
$$a_{21} = 2K_3$$
$$a_{12} = \sqrt{3}\, K_1 - K_2$$
$$a_{22} = \sqrt{3}\, K_2 - K_3$$
$$a_{13} = -\sqrt{3}\, K_1 - K_2$$
$$a_{23} = -\sqrt{3}\, K_2 - K_3$$

(57)

The computed values from block 132 are fed via path 134 to exit 128 and are used in block 138 to determine X, Y as described below.

Thus, when the system is switched by the operator to the calibrate mode the outputs on path 96 are collected during the 360° turn of the vehicle. After the turn, the operator switches from the calibrate mode to the automatic mode and the collected outputs are applied to determine the calibration parameters.

When the system is not in calibrate mode but in automatic mode, the system is enabled to compute and apply the data collected when in the calibrate mode. In the automatic mode, X and Y are determined from the information obtained from blocks 72, 124, 132 in Apply Calibration Parameters to Form X, Y, from block 138 by the following equations:

$$X = a_{11}(U'' - B_u) + a_{12}(V'' - B_v) + a_{13}(W'' - B_w)$$

$$Y = a_{21}(U'' - B_u) + a_{22}(V'' - B_v) + a_{23}(W'' - B_2)$$

(58)

X, Y values are then fed via path 140 to Normalize block 142. Normalized values $X'$, $Y'$ are computed in the following manner:

$$X' = X/\sqrt{X^2 + Y^2}$$
$$Y' = Y/\sqrt{X^2 + Y^2}$$

(59)

Equations (59) are similar to equations (52) except the $\frac{1}{3}$ factor is deleted as a result of the normalization.

After normalizing, $X'$, $Y'$ are fed via path 144 to Compute Heading block 146 where arc tangent $(X', Y')$ is computed and fed via path 148 to Exit 128. From Exit 128 the calibrated heading may be fed to an heading indicator, position plotter, dead reckoning system or other use which are not shown.

Referring to FIG. 4, a simplified block diagram showing both hardware and software controlled data processing system function blocks or circles is shown, the hardware blocks being in dashed section 152. Compass drive circuit 154 is coupled to compass demodulation circuit 156, drive winding d providing the drive signal for compass windings u, v, w in conventional manner to circuit 154. Circuit 156 feeds analog signals U, V, W from windings u, v, w respectively to sample and holds 3 circuit 158 which samples and holds each of the U, V, W signals and feeds these signals to multiplexor circuit 160. Circuit 160 supplies the U, V, W signals serially to analog/digital converter circuit 162 where the analog signals are converted to digital signals. Timing circuit 164 supplies timing signals to circuits 158, 160, 162. The hardware thus described corresponds to circuits 36, 40, 48, 58 in FIG. 2.

The output of converter circuit 162 is supplied to push down stack 165 which time filters the U, V, W signals to provide $U''$, $V''$, $W''$ signals in the manner described for block 64, FIG. 3. The $U''$, $V''$, $W''$ signals from stack 165 are provided to register file 166, minimum-maximum block 168 and subtracter 170. File 166 also receives a timing signal from circuit 164. Block 168 determines the minimum and maximum values of each of $U''$, $V''$, $W''$ signals for each 360° turn of the host vehicle and supplies these values to file 166. File 166 supplies the $U''$, $V''$, $W''$ signals and the minimum and maximum values on a timed basis to compensation process function block 171 which performs the functions of blocks 124, 132, in FIG. 2 and which computes and furnishes the biases $B_u$, $B_v$, $B_w$ on bias line 172 to subtracter 170 where they are subtracted from $U''$, $V''$, $W''$ respectively. The output of subtracter 170 is supplied on path 174 to register stack 176 which supplies $(U'' - B_u)$ on path 178 to each of multiply function circles 180, 182; $(V'' - B_v)$ on path 184 to each of multiply function circles 186, 188, and $(W'' - B_w)$ on path 190 to each of multiply function circles 192, 194. Values $a_{11}$, $a_{12}$, $a_{13}$, $a_{21}$, $a_{22}$, $a_{23}$, are provided to multiply function circles 180, 186, 192, 182, 188, 194 respectively from process function block 171 wherein the product values $a_{11}(U'' - B_u)$, $a_{12}(V'' - B_v)$, $a_{13}(W'' - B_w)$, $a_{21}(U'' - B_u)$, $a_{22}(V'' - B_v)$, $a_{23}(W'' - B_w)$ are obtained. $a_{11}(U'' - B_u)$, $a_{12}(V'' - B_v)$, $a_{13}(W'' - B_w)$ are supplied from multiply function circles 180, 186, 192 respectively to add function block 196 to obtain the X value on path 198 according to $X = a_{11}(U'' - B_u) + a_{12}(V'' - B_v) + a_{13}(W'' - B_w)$ which is supplied to each of normalize blocks 200, 202. In like manner, $a_{21}(U'' - B_u)$, $a_{22}(V'' - B_v)$, $a_{23}(W'' - B_w)$ are supplied from multiply function circles 182, 188, 194 respectively to add function block 204 to obtain the Y value on path 206 according to $Y = a_{21}(U''-B_u) + a_{22}(V''-B_v) + a_{23}(W''-B_w)$ which is supplied to each of normalize function blocks 200, 202 where $$X' = X/\sqrt{X^2 + Y^2} \text{ and } Y' = Y/\sqrt{X^2 + Y^2}$$

are obtained respectively and supplied to arc tan function block 208 from which the calibrated compass heading is provided on line 210. Thus the circuitry between line 172 and lines 198, 206 corresponds to block 138 in FIG. 2; blocks 200, 202 correspond to block 142 in FIG. 2; and block 208 corresponds to block 146 in FIG. 2.

Whereas in most cases the two dimensional horizontal embodiment described above is sufficient, an extension into three dimensions if required is straightforward. A three dimensional embodiment would be important when either pitch and roll are constant for long periods of time and then change abruptly; or the magnetic latitude and hence the magnetic field "dip" angle changes appreciably. Since both of these situations can significantly change the earth's magnetic field strength and/or the vertical component of the earth's field, a change in either the size or bias offset of the ellipse in the horizontal plane can occur.

The three dimensional model is an ellipsoid formed by rotating an ellipse about its semimajor axis allowing the equivalent rotated semiminor axis vector to trace an ellipse, defined as the minor ellipse. The semimajor axis would again be aligned with the direction at which the host vehicle induces a maximum in the magnetic flux density. This ellipsoid effect can be described by six terms:

(1) a—scaling along the semimajor axis of the ellipsoid.
(2) b—scaling along the semimajor axis of the minor ellipse.
(3) c—scaling along the semiminor axis of the minor ellipse.
(4) $\theta$—the angle between North and the semimajor axis of the ellipsoid in the horizontal plane of the host vehicle.
(5) $\phi$—the angle between the horizontal plane of the host vehicle and the semimajor axis of the ellipsoid.
(6) $\beta$—the angle of rotation of the minor ellipse with respect to the semimajor axis of the ellipsoid.

The elliptic model for the two dimensional embodiment described earlier is an horizontal "slice" through this ellipsoid. The effect of pitch and roll on a suspended flux gate sensor where a certain orientation is maintained for a long time and then abruptly changed is to change the horizontal slice through the ellipsoid. By changing this slice the parameters describing the ellipse could change. The effect of changing the magnetic field dip angle would be to change $\phi$, the angle between the horizontal plane of the host vehicle and the ellipsoid's semimajor axis, and translate the three dimensional center of the ellipsoid. The net effect on the horizontal slice of the ellipsoid received by the sensor is to translate the origin but maintain the shape of the ellipse with the possible exception of overall scale. The net effect to the horizontal calibration is a change in the bias values. Also, this invention can be used with a speed log input, or other speed input, of the host vehicle to obtain a navigational system for the host vehicle.

While there have been described above the principles of this invention in connection with specific embodiments, it is to be understood that this is by way of example and is not limiting of the scope of this invention.

What is claimed is:

1. Apparatus for calibrating the distortions in the readings of a magnetic compass having a plurality of windings in a two dimensional plane and mounted in a vehicle comprising:
   first means coupled to the compass windings for obtaining the outputs from each of the windings as a function of time by weighting and combining the outputs from each of the windings at a first time and for a predetermined number of the next previous times to said first time to obtain a time filtered output for each of the windings;
   second means coupled to said first means for receiving the time filtered outputs and for obtaining maximum and minimum filtered outputs for each of the windings as the vehicle is turned through a circle of 360°;
   third means coupled to said second means for computing biases from the maximum and minimum filtered outputs equal to the average of the maximum and minimum filtered outputs from each winding;
   fourth means coupled to said third means for applying said biases to said maximum and minimum outputs to obtain a series of calibration parameters;
   fifth means coupled to said first means and said fourth means for applying said parameters to said time filtered outputs to convert said time filtered outputs from said first means to two winding outputs, said two windings being orthogonally related to one another;
   sixth means for obtaining the calibrated compass heading from said two winding outputs.

2. The apparatus of claim 1 including seventh means coupled between said fifth means and said sixth means for normalizing said two winding outputs by dividing each of said two winding outputs by the square root of the sum of the squares of each of said two winding outputs.

3. The apparatus of claim 1 including eighth means coupled between each of said compass windings and each of said first means and said second means for sensing the amplitude of the winding outputs and increasing or decreasing the amplitudes of the winding outputs to fit within a predetermined sensor scale of amplitudes.

4. The apparatus of claim 3 wherein said eighth means comprises integrating means for integrating the winding incremental outputs and increasing the number of winding incremental outputs integrated when the winding outputs fall below the sensor scale and decreasing the number of winding incremental outputs integrated when the winding outputs are above the sensor scale.

5. The apparatus of claim 1 wherein the number of windings in the compass is three and the three windings are arcuately spaced approximately 120° from one another and the outputs from the three windings are U, V, W respectively, said third means comprises computing means for obtaining $$B_u = (\overline{U} + \underline{U})/2$$

$$B_v = (\overline{V} + \underline{V})/2$$

$$B_w = (\overline{W} + \underline{W})/2$$

where $B_u$, $B_v$, $B_w$ are biases and $\overline{U}$, $\overline{V}$, $\overline{W}$ are maximum outputs and $\underline{U}$, $\underline{V}$, $\underline{W}$, are minimum outputs as the vehicle is turned through a complete circle;

said fourth means comprises computing means for obtaining $$U' = \overline{U} - B_u$$
$$V' = \overline{V} - B_v$$
$$W' = \overline{W} - B_w$$
$$Z = [(U')^2 + (V')^2 + (W')^2]/3$$
$$P = Z - (U')^2$$
$$Q = [(V')^2 - (W')^2]/\sqrt{3}$$
$$R = \sqrt{P^2 + Q^2}$$
$$S_2 = Q/R$$
$$C_2 = P/R$$
$$a = \sqrt{Z + R}$$
$$b = \sqrt{Z - R}$$
$$f = 1 - (b/a)$$
$$g = 1 + (b/a)$$
$$K_1 = g - fC_2$$
$$K_2 = fS_2$$
$$K_3 = g + fC_2$$
$$a_{11} = 2K_2$$
$$a_{21} = 2K_3$$
$$a_{12} = \sqrt{3}\, K_1 - K_2$$
$$a_{22} = \sqrt{3}\, K_2 - K_3$$
$$a_{13} = -\sqrt{3}\, K_1 - K_2$$
$$a_{23} = -\sqrt{3}\, K_2 - K_3.$$

6. The apparatus of claim 5 wherein the number of windings in the compass is three and the three windings are arcuately spaced 120° from one another and the outputs from the three windings are U, V, W respectively, said first means comprises push down stack means for obtaining time filtered outputs U''', V''', W''' having the form:

$$F = P_1 - P_2 - 2P_3 + 4P_4 - 2P_5 - P_6 + P_7$$

where for the U reading $F = U'''(t)$, $P_1 = U(t)$, $P_2 = V(t-1)$, $P_3 = W(t-2)$, $P_4 = U(t-3)$, $P_5 = V(t-4)$, $P_6 = W(t-5)$, $P_7 = U(t-6)$; where for the V reading $F = V'''(t)$, $P_1 = V(t)$, $P_2 = W(t-1)$, $P_3 = U(t-2)$, $P_4 = V(t-3)$, $P_5 = W(t-4)$, $P_6 = U(t-5)$, $P_7 = V(t-6)$; where for the W reading $F = W'''(t)$, $P_1 = W(t)$, $P_2 = U(t-1)$, $P_3 = V(t-2)$, $P_4 = W(t-3)$, $P_5 = U(t-4)$, $P_6 = V(t-5)$, $P_7 = W(t-6)$ and where t=present time and (t−n) is the time equal to the present time t minus the next previous n time units.

7. The apparatus of claim 6 wherein said filtered outputs from said three windings are U''', V''', W''' respectively and said two winding outputs are X, Y respectively, and said fifth means converts to the said two winding outputs by obtaining:

$$X = a_{11}(U''' - B_u) + a_{12}(V''' - B_v) + a_{13}(W''' - B_w)$$
$$Y = a_{21}(U''' - B_u) + a_{22}(V''' - B_v) + a_{23}(W''' - B_w).$$

8. The apparatus of claim 7 wherein said fifth means is for normalizing the X, Y outputs to obtain X', Y', respectively, as follows:

$$X' = X/\sqrt{X^2 + Y^2}$$
$$Y' = Y/\sqrt{X^2 + Y^2}.$$

9. The apparatus of claim 8 wherein said sixth means is for obtaining the heading arc tangent from X', Y'.

10. The apparatus of claim 1 wherein the number of windings in the compass is three and the three windings are arcuately spaced 120° from one another and the outputs from the three windings are U, V, W respectively, said first means comprises push down stack means for obtaining time filtered outputs U''', V''', W''' having the form:

$$F = P_1 - P_2 - 2P_3 + 4P_4 - 2P_5 - P_6 + P_7$$

where for the U reading $F = U'''(t)$, $P_1 = U(t)$, $P_2 = V(t-1)$, $P_3 = W(t-2)$, $P_4 = U(t-3)$, $P_5 = V(t-4)$, $P_6 = W(t-5)$, $P_7 = U(t-6)$; where for the V reading $F = V'''(t)$, $P_1 = V(t)$, $P_2 = W(t-1)$, $P_3 = U(t-2)$, $P_4 = V(t-3)$, $P_5 = W(t-4)$, $P_6 = U(t-5)$, $P_7 = V(t-6)$; where for the W reading $F = W'''(t)$, $P_1 = W(t)$, $P_2 = U(t-1)$, $P_3 = V(t-2)$, $P_4 = W(t-3)$, $P_5 = U(t-4)$, $P_6 = V(t-5)$, $P_7 = W(t-6)$ and where t=present time and (t−n) is the time equal to the present time t minus the next previous n time units.

11. The apparatus of claim 10 wherein said filtered outputs from said three windings are U''', V''', W''' respectively and said two winding outputs are X, Y respectively, and said fifth means converts to the said two winding outputs by obtaining:

$$X = a_{11}(U''' - B_u) + a_{12}(V''' - B_v) + a_{13}(W''' - B_w)$$
$$Y = a_{21}(U''' - B_u) + a_{22}(V''' - B_v) + a_{23}(W''' - B_w).$$

12. The apparatus of claim 11 wherein said fifth means is for normalizing the X, Y outputs to obtain X', Y', respectively, as follows:

$$X' = X/\sqrt{X^2 + Y^2}$$
$$Y' = Y/\sqrt{X^2 + Y^2}.$$

13. The apparatus of claim 12 wherein said sixth means is for obtaining the heading arc tangent from X', Y'.

14. Apparatus for calibrating the distortions in the readings of a magnetic compass having a plurality of separated vector outputs having a common origin and mounted in a vehicle comprising:
- first means coupled to the compass for providing output terminals corresponding to each of said vector outputs;
- second means coupled to said first means terminals for calibrating the compass vector outputs for distortions due to the permanent and induced magnetism of the vehicle and providing first distortion correction signals;
- third means coupled to said first means terminals for calibrating the gain imbalance and separation misorientation between the vector outputs and providing second distortion correction signals;
- fourth means coupled to said second and third means for receiving said first and second distortion correction signals and for providing a calibrated compass heading.

15. The apparatus of claim 14 wherein said second means comprises means for compensating for the origin offset due to the permanent magnetic distortion effect of the vehicle on the compass vector outputs, said offset being the difference between the vector origin location of the distorted vector outputs for all headings of the compass and the vector origin location of the undistorted vector outputs for all headings of the compass;
said second means further comprising means for compensating for the difference in configuration of geometric figures defined by the distorted vector outputs and the undistorted vector outputs due to the induced magnetic distortion effects of the vehicle on the compass vector outputs for all headings of the compass.

16. The apparatus of claim 15 wherein said geometric figure for the distorted vector outputs is in the shape of an ellipse and the geometric figure for the undistorted vector outputs is in the shape of a circle.

17. A method for calibrating the distortions in the readings of a magnetic compass having a plurality of windings in a two dimensional plane and mounted in a vehicle comprising the steps of:
- first step of obtaining the outputs from each of the windings as a function of time by weighting and combining the outputs from each of the windings at a first time and for a predetermined number of the next previous times to said first time to obtain a time filtered output for each of the windings;
- second step of receiving the time filtered outputs and for obtaining maximum and minimum filtered outputs for each of the windings as the vehicle is turned through a circle of 360°;
- third step of determining biases from the maximum and minimum filtered outputs equal to the average of the maximum and minimum filtered outputs from each winding;
- fourth step of applying said biases to said maximum and minimum outputs to obtain a series of calibration parameters;
- fifth step of applying said parameters to said time filtered outputs to convert said time filtered outputs from said first means to two winding outputs, said two windings being orthogonally related to one another;
- sixth step of obtaining the calibrated compass heading from said two winding outputs.

18. The method of claim 17 including a seventh step of normalizing said two winding outputs by dividing each of said two winding outputs by the square root of the sum of the squares of each of said two winding outputs.

19. The method of claim 17 including an eighth step of sensing the amplitude of the winding outputs and increasing or decreasing the amplitudes of the winding outputs to fit within a predetermined sensor scale of amplitudes.

20. The method of claim 17 wherein said fifth step comprises normalizing the X, Y outputs to obtain X', Y', respectively, as follows:

$$X' = X/\sqrt{X^2 + Y^2}$$

$$Y' = Y/\sqrt{X^2 + Y^2} .$$

21. The method of claim 20 wherein said sixth step comprises obtaining the heading arc tangent from X', Y'.

22. A method for calibrating the distortions in the readings of a magnetic compass having a plurality of separated vector outputs having a common origin and mounted in a vehicle comprising the steps of:
- first step of calibrating the compass vector outputs for distortions due to the permanent and induced magnetism of the vehicle and providing first distortion correction signals;
- second step of calibrating the gain imbalance and separation misorientation between the vector outputs and providing second distortion correction signals;
- third step of receiving said first and second distortion correction signals and for providing a calibrated compass heading.

23. The method of claim 22 wherein said first step comprises compensating for the origin offset due to the permanent magnetic distortion effect of the vehicle on the compass vector outputs, said offset being the difference between the vector origin location of the distorted vector outputs for all headings of the compass and the vector origin location of the undistorted vector outputs for all headings of the compass;
said first step further comprising compensating for the difference in configuration of geometric figures defined by the distorted vector outputs and the undistorted vector outputs due to the induced magnetic distortion effects of the vehicle on the compass vector outputs for all headings of the compass.

24. The method of claim 23 wherein said geometric figure for the distorted vector outputs is in the shape of an ellipse and the geometric figure for the undistorted vector outputs is in the shape of a circle.

* * * * *